United States Patent [19]

Trubiano

[11] Patent Number: 4,561,676
[45] Date of Patent: Dec. 31, 1985

[54] SAFETY BELT FOR SHOPPING CART

[75] Inventor: Antoine Trubiano, Pointe aux Trembles, Canada

[73] Assignee: Cari-All Inc., Quebec, Canada

[21] Appl. No.: 561,802

[22] Filed: Dec. 15, 1983

[51] Int. Cl.$^4$ .............................................. B60R 21/10
[52] U.S. Cl. ................... 280/801; 24/265 EC; 24/232 R; 24/489; 280/33.99 B; 280/289 WC; 280/DIG. 4; 297/468
[58] Field of Search .................. 280/801, 748, 289 E, 280/289 WC, 290, 650, DIG. 4, 33.99 A, 33.99 B, 805; 297/468, 471; 24/519, 489, 265 EC, 232 R, 233, 234, 235

[56] References Cited

U.S. PATENT DOCUMENTS

| | | | |
|---|---|---|---|
| 2,799,322 | 7/1957 | Jordan | 297/468 |
| 2,814,336 | 11/1957 | Manhart et al. | 297/468 |
| 2,871,927 | 2/1959 | Materi | 297/471 |
| 3,306,661 | 2/1967 | Allen | 280/33.99 B |
| 3,350,136 | 10/1967 | Allen | 280/33.99 B |
| 3,428,355 | 2/1969 | Hamilton | 24/232 |
| 3,807,798 | 4/1974 | Mattson | 297/471 |

Primary Examiner—Joseph F. Peters, Jr.
Assistant Examiner—Kenneth R. Rice
Attorney, Agent, or Firm—Oblon, Fisher, Spivak, McClelland & Maier

[57] ABSTRACT

A child safety belt for attachment across a seat having an attaching side rod element for releasable securement of the belt thereto. The belt comprises a strap having elastic properties and a detachable securing buckle is secured to at least one end of the strap. The securing buckle has a pair of jaw members pivotally interconnected on a pivot axis to move from a closed to an open position. A first of the jaw members has a throat portion to receive the side rod element therein. A second of the jaw members has a strap attaching end rearwardly and offset from the pivot axis in a direction toward the first jaw member whereby tension on the strap urges the second jaw member against the first jaw member when the side rod is received in the throat portion and the jaw members are brought to the closed position.

9 Claims, 5 Drawing Figures

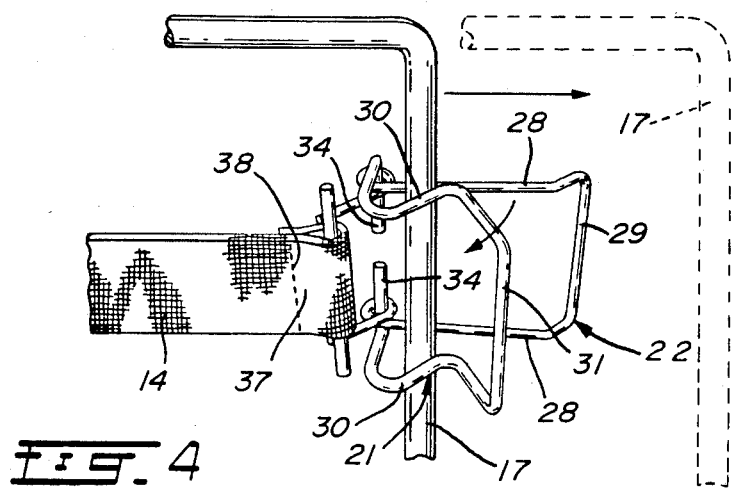
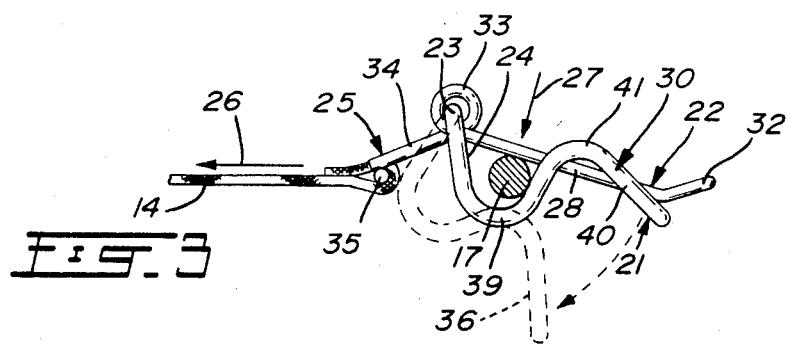
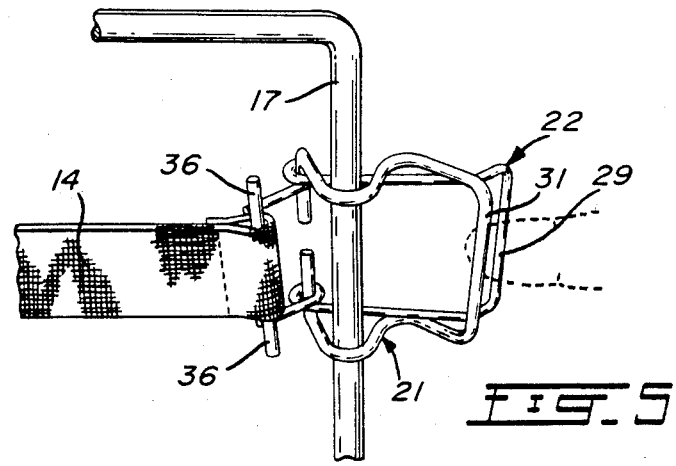

SAFETY BELT FOR SHOPPING CART

BACKGROUND OF THE INVENTION (a) Field of the Invention

The present invention relates to a child safety belt for attachment across a seat having an attaching side rod element for releasable securement of the belt thereto, and particularly, but not exclusively, for securing a child seated on a seat formed in the rear gate of a shopping cart.

(b) Description of Prior Art

Various devices have been provided to restrain children in seats, such as safety seats which are strapped onto vehicle car seats and equipped with a restraining harness. Many accidents occur when children are left unattended on a seat formed in the rear gate of a shopping cart. The child being at liberty to move often will stand up or kneel on such seat whereby to attempt to grab foodstuff which is placed into the shopping cart basket or which is displayed on shelving adjacent to the shopping cart. Thus, when a child is left unattended for a short duration of time, he can suffer serious injuries should he fall off the shopping basket. Also, seeing such baskets are supported on wheels, a child is more susceptible to fall off when kneeling or standing on the rear seat due to the instability of the shopping cart.

Similar problems can also occur when a child is seated in a high chair or other such seats left unattended. There is therefore a requirement to provide a safety means to overcome such problems.

SUMMARY OF INVENTION

It is a feature of the present invention to provide a child safety belt for attachment across a seat or a backrest of a seat for restraining a child therein.

It is another feature of the present invention to provide a child safety belt for attachment across the seat of a shopping cart formed in an end gate of the cart.

Another feature of the present invention is to provide a safety belt for attachment to the seat of a shopping cart and which is completely removable, easy to assemble, easy to remove and which restrains a child seated on such seat.

Another feature of the present invention is to provide a safety belt for restraining a child in a seat of a shopping cart and wherein the belt is sanitary and completely removable whereby to be reused on different shopping carts.

According to the above features, from a broad aspect, the present invention provides a child safety belt for attachment across a seat having an attaching side rod element for releasable securement of the belt thereto. The belt comprises a strap having elastic properties and a detachable securing buckle is secured to at least one end of the strap. The securing buckle has a pair of jaw members pivotally interconnected on a pivot axis to move from a closed to an open position. A first of the jaw members has a throat portion to receive the side rod element therein. A second of the jaw members has a strap attaching end rearwardly and offset from the pivot axis in a direction toward the first jaw member whereby tension on the strap urges the second jaw member against the first jaw member when the side rod is received in the throat portion and the jaw members are brought to the closed position.

BRIEF DESCRIPTION OF DRAWINGS

A preferred embodiment of the present invention will now be described with reference to an example thereof as illustrated in the accompanying drawings, in which:

FIG. 3 is a side view showing the construction of the securing buckle;

FIG. 4 is a perspective fragmented view showing the manner in which the buckle is secured to a side rod of a seat backrest; and FIG. 5 is a fragmented perspective view showing how the buckle is released from the side rod of the seat backrest.

DESCRIPTION OF PREFERRED EMBODIMENTS

Figure 1:
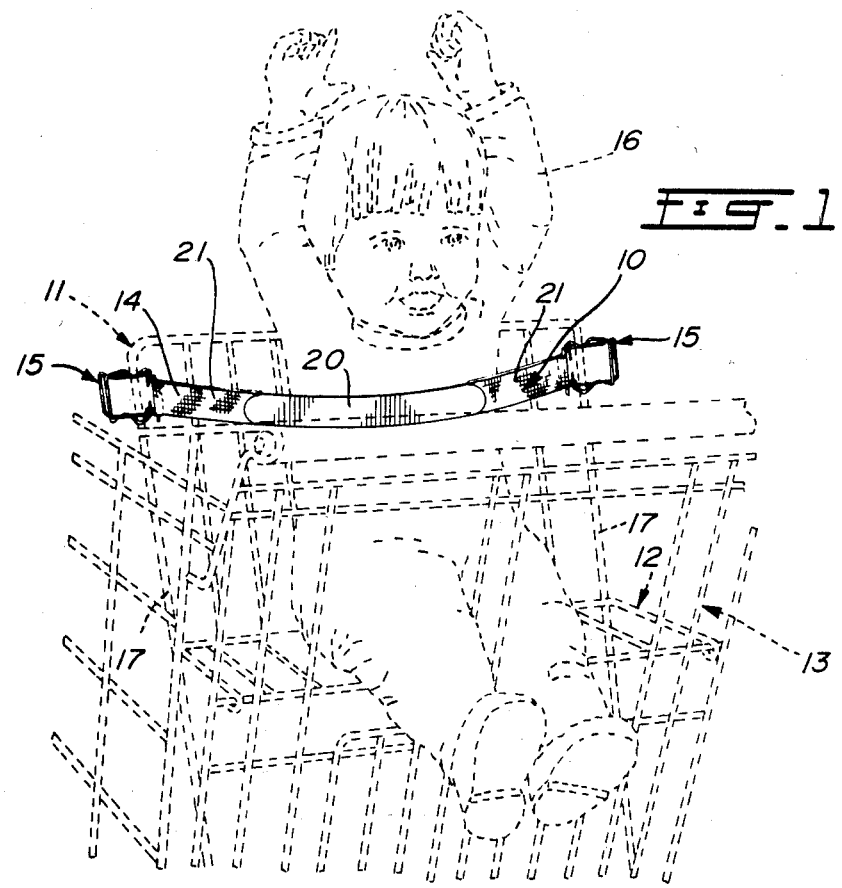
FIG. 1 is a perspective view of the child safety belt of the present invention as used on the seat of a shopping cart.

Referring now to the drawings, and more particularly to FIG. 1, there is shown at 10 the child safety belt of the present invention as attached to the backrest portion 11 of an infant seat 12 secured to the rear gate 13 of a shopping cart of the type displaceable on casters (not shown). The belt 10 is formed by a strap 14 which may be formed of rigid material or formed wholly or partly of elastomeric material and having a detachable securing buckle 15 secured to opposed ends thereof for attaching the belt 10 across a child 16 seated on the seat 12. As herein shown, the buckles 15 are secured to the outermost side rods 17 of the backrest 11.

Figure 2:
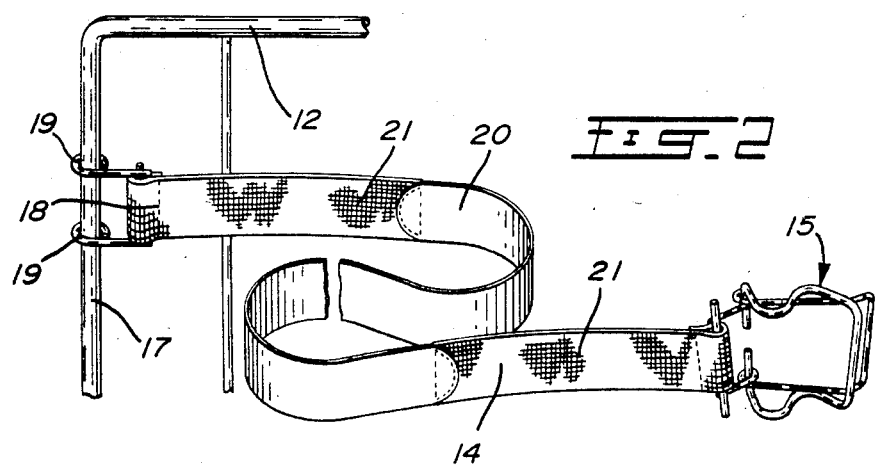
FIG. 2 is a fragmented perspective view showing a modification of the safety belt as shown in FIG. 1.

FIG. 2 shows a variation of the construction of the safety belt 10 and herein the belt is permanently attached at one end 18 by means of hooks 19 which can slide up and down the side rod 17 of the backrest member 12. The other end of the strap 14 is provided with the buckle 15. However, it is pointed out that it is preferable to have belts with opposed buckles whereby the belt can be used on different shopping carts thus providing a considerable saving in not having to provide a belt for every cart as usually found in department stores. Usually, such stores could carry four hundred to five hundred carts and there thus need only be thirty to forty such safety belts to service the customers with small children.

In the embodiment shown in FIg. 1, the strap 14 has a central elongated portion 20 formed of a plastics material and opposed elastic end portions 21. The central elongated portion 20 is thus readily cleanable by simply wiping it. It is advantageous to have that central portion formed of a plastics material as this portion of the belt is often soiled by children and it can easily be wiped clean after use.

Referring now to FIGS. 3 to 5, there will be described the construction of the securing buckle 15. The buckle is herein shown as formed from bent wires defining a pair of jaw members, herein a first jaw member 21 and a second jaw member 22. These jaw members are pivotally interconnected on a pivot axis 23 to move from a closed position, as shown in FIG. 3, to an open position, as shown in FIG. 4. The first jaw member 22 has a throat portion 24 to receive the side rod 17 therein. The second jaw member 22 is provided with a strap attaching end 25 disposed rearwardly and offset from the pivot axis 23 and extending in a direction toward the first jaw member 22 whereby tension on the strap in the direction of arrow 26 urges the second jaw member 22 against the first jaw member 21 in the direction as illustrated by arrow 27. This is so when the rod 17 is located in the throat portion 24 whereby to arrest the displacement of the jaw members when placed in their closed position.

As more clearly shown in FIGS. 4 and 5, the second jaw member is constituted by opposed parallel side arms 28 and a transverse end interconnecting arm 29. The first jaw member 21 also has parallel side arms 30 and an interconnecting arm 31 but the side arms 28 of the second jaw member are longer whereby the interconnecting arm 29 protrudes beyond the interconnecting arm 31 whereby to provide finger engagement, as shown in FIG. 5, to open the buckle for disengagement with the side rod 17. As clearly shown in FIG. 3, the end of the side arms 28 have an upturn front end portion 32 defining the protruding end. Also, as more clearly shown in FIG. 3, the straight arms 28 have a loop 33 formed about a respective one of pivot rod ends 34 formed at an end opposite the interconnecting arm 31 of the first jaw member 21. The strap attaching end 25 is constituted by an angulated rear end wire portion 34 formed in each of the straight arms 28 and extending rearwardly of the second jaw member 21. A transverse connecting rod 35 is secured across the angulated rear end portions 34 and extend therebeyond to define stop abutments 36 (see FIGS. 4 and 5) whereby to provide an abutment for the first jaw member when in its open position as shown in phantom lines 36 in FIG. 3. The ends of the strap 14 are secured about these transverse connecting rods 35 by overlapping an end portion 37 and applying stitches 38 thereacross as is common practice.

Referring again to FIG. 3, the configuration of the first jaw member 21 is clearly shown. The throat portion 24 is defined by each side arm 30 having a U-shape bend 39 formed therein and opening in the direction of the second jaw member 22. A downwardly extending end portion 40 extends from an apex portion 41 of an outermost arm of the U-shape bend. The apex portion 41 extends beyond the side arm 28 of the second jaw member, when the jaw members are in their closed position, as herein shown. As tension is applied to the belt in the direction of arrow 26, the side arms 28 of the second jaw member 22 will come to rest over the interconnecting arm 31 of the first jaw member 21. Thus, the more force being applied in the direction of arrow 26, the more pressure being applied in the direction of arrow 27 and the more secure the buckle becomes about the attaching rod 17.

It is within the ambit of the present invention to cover any obvious modifications of the example of a preferred embodiment described herein, provided such modifications fall within the scope of the appended claims. For example, the safety belt of the present invention is not limited for use on a child's seat found in the rear gate of a shopping cart but it is conceivable that it could be used on other type seats, such as high chairs and wherein an attaching side rod element would be provided to one side of the seat or the backrest for securing the buckle end of the belt or on both sides if the belt is provided with opposed buckles and not permanently attached to the seat. Also, the straps could have an adjustment buckle therealong to vary the length of the strap.

I claim:

1. A child safety belt for attachment across a seat having an attaching side element for releasable securement of said belt thereto, said belt comprising a strap, a detachable securing buckle secured to at least one end of said strap, said securing buckle being formed from bent wires and defining a pair of jaw members pivotally interconnected on a pivot axis to move from a closed to an open position, a first of said jaw members having a throat portion to receive said side element therein, a second of said jaw members having a strap attaching end rearwardly and offset from said pivot axis in a direction toward said first jaw member whereby tension on said strap urges said second jaw member against said first jaw member when said side element is received in said throat portion and said jaw members are brought to said closed position, both said jaw members having opposed parallel side arms and a transverse end interconnecting arm, said interconnecting arm of one of said jaw members having a protruding end extending beyond the interconnecting arm of the other jaw member for finger engagement whereby to separate said jaw members when in said closed position.

2. A safety belt as claimed in claim 1 wherein said seat is a wire mesh seat of a shopping cart and having a seat portion and a backrest portion formed by an end gate of said cart.

3. A safety belt as claimed in claim 2 wherein said attaching side element is a side rod of said backrest portion.

4. A safety belt as claimed in claim 2 wherein said belt is provided at both ends with one of said detachable securing buckle.

5. A safety belt as claimed in claim 3 or 4 wherein said strap is formed of an elastomeric material.

6. A safety belt as claimed in claim 3 or 4 wherein said strap has a central elongated portion formed of a plastics material and opposed elastic portions secured to a respective one of said securing buckles.

7. A safety belt as claimed in claim 1 wherein said first jaw member side arms each have a transverse pivot rod end at an end opposite said interconnecting arm, said throat portion being defined by said side arm having a U-shape bend therein opening in the direction of said second jaw member and a downwardly extending end portion extending from an apex portion of an outermost arm of said U-shape bend, said apex portion extending beyond said side arms of said second jaw member when said jaw members are in their closed position.

8. A safety belt as claimed in claim 7 wherein said side arms of said first jaw member straight arms have an upturned front end portion defining said protruding end, said straight arms having a loop formed about a respective one of said pivot rod ends adjacent said strap attaching end.

9. A safety belt as claimed in claim 8 wherein said strap attaching end is constituted by an angulated rear end portion formed in each said straight arms and extending rearwardly of said second jaw member, and a transverse connecting rod secured across said angulated rear end portions and extending therebeyond to define stop abutments for said side arms of said second jaw member to limit the pivotal movement of said jaw members in their open position.

* * * * *